Patented Jan. 25, 1949

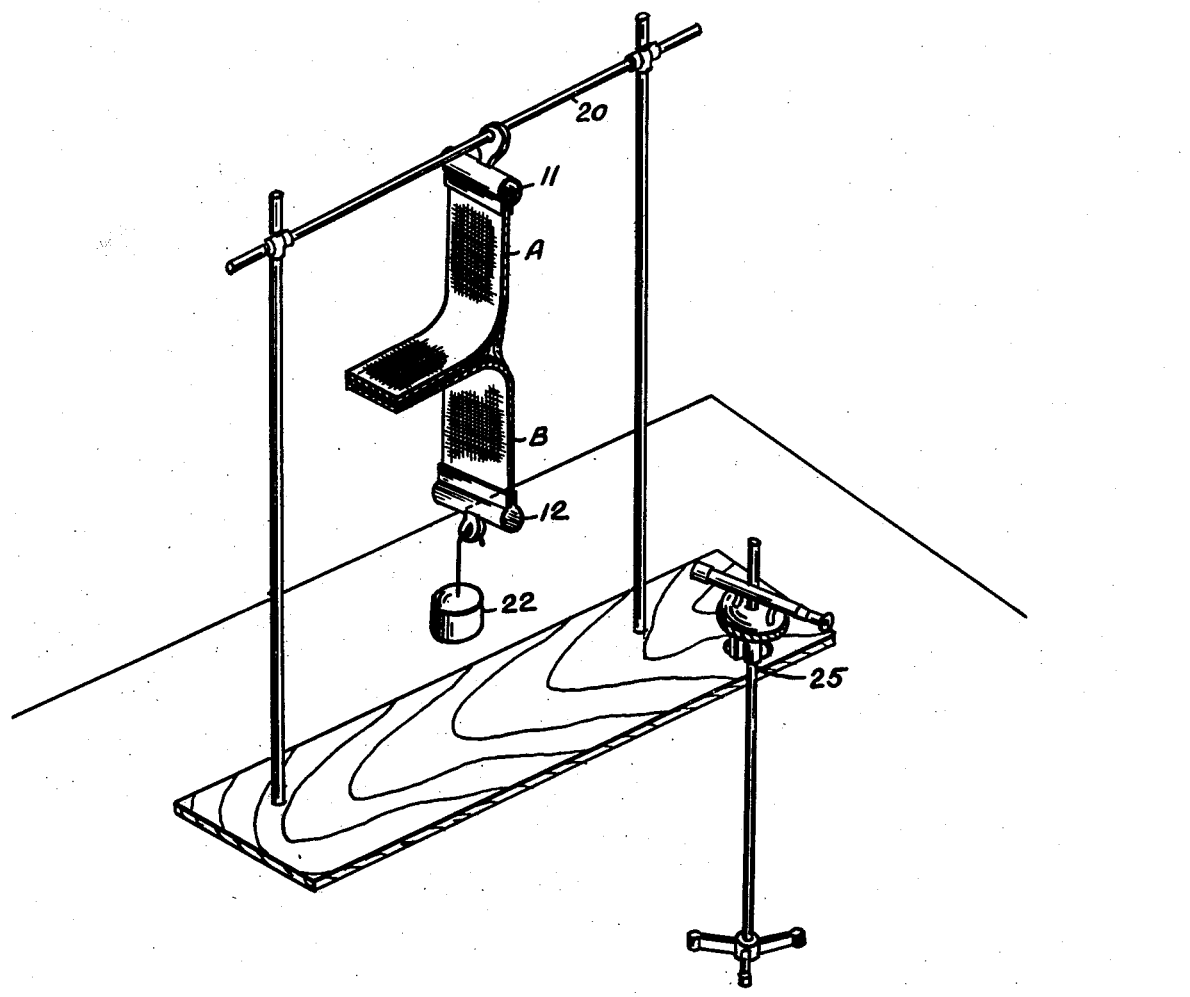

2,459,955

UNITED STATES PATENT OFFICE 2,459,955

POLYVINYL ACETATE EMULSION ADHESIVE

George Osman Morrison, Thomas Patton Gladstone Shaw, and Joseph Donat Paul-Emile Mercier, Shawinigan Falls, Quebec, Canada, and Henry Michael Collins, Stamford, Conn., assignors to Shawinigan Chemicals Limited, Montreal, Quebec, Canada, a corporation of Canada Application November 9, 1945, Serial No. 627,760
In Canada October 17, 1945

2 Claims. (Cl. 260—17)

INTRODUCTION

This invention relates to adhesives embodying aqueous emulsions of polyvinyl acetate.

OBJECTS

Principal objects of the invention are to provide various polyvinyl acetate adhesive compositions which, in addition to other desirable characteristics, are capable of one or more of the following functions: (a) forming bonds having high resistance to slip, (b) bonding under heat and pressure, (c) being bonded for periods as long as several days after the adhesive is applied, (d) being bonded while a considerable portion of the volatile vehicle is still present in the adhesive film, (e) giving adhesive bonds which are substantially water-resistant. A further object of the invention is to provide compositions capable of variation in properties by simple compounding.

THE INVENTION

Films of polyvinyl acetate may be readily produced from thin layers of aqueous emulsions of polyvinyl acetate by the evaporation of the water, and the properties of these films can be modified by the addition of plasticizers and/or solvents to the emulsion. We have discovered, however, that by the selection of certain types of emulsions containing polyvinyl acetate above a certain minimum viscosity and by the use of certain plasticizers in selected amounts, that we obtain excellent adhesives. We have also found that still further and unexpected improvement in the properties results from the inclusion in these adhesives of nitrocellulose.

THE PARENT EMULSION

The parent polyvinyl acetate emulsions to be used in this invention are selected from those made by polymerizing vinyl acetate in an aqueous medium using an anion-active surface-active agent and two organic hydrophilic colloids which have the ability to act together to form a stable emulsion at a much lower concentration than that at which one will act alone. The specific emulsions of this group which we employ in this invention are those in which one of the emulsifiers is selected from the tragacanth group of water-soluble natural gums as described in Handbook No. 4, "The Soluble Gums" published by the Philadelphia Museums, 1921, sometimes referred to as the Bassorin type, see Hackh's Chemical Dictionary, Third Edition, 1944. The former publication states, with regard to the tragacanth group of gums: "The gums of this group swell in cold water, forming a thick, usually translucent jelly. After some hours this can be shaken up with many times its volume of water, to form a strong mucilage." Gum tragacanth itself is particularly desirable, and may be used in concentrations ranging from about 0.25% to about 1.0% by weight on the parent emulsion. The other colloid is selected from the group of polyvinyl acetates preferably of original viscosity from about 7 C. P. S. to about 15 C. P. S. (but this can be varied widely) which have been partially hydrolyzed so that they contain from about 16% to about 35% by weight of polyvinyl acetate and may be used in concentrations ranging from about 0.25% to about 0.75%. The total amount of emulsifier may range from about .5% to about 1.75%. The anion-active surface-active agent is preferably used in concentrations ranging from about 0.1% to about 0.15%.

The concentration of polyvinyl acetate in the parent emulsion may range from about 40% to about 60%, with about 54% to about 57% preferred. The emulsion viscosity may range from about 100 centipoises to about 5000 centipoises at 20° C., the preferred range being from about 1500 centipoises to about 3000 centipoises at 20° C.

POLYVINYL ACETATE

The polyvinyl acetate should have a viscosity greater than about 20 C. P. S. with those having a viscosity above about 120 C. P. S. preferred. Increased resistance to "slip" is obtained by using higher polymers, while at the same time the desired tack is retained without an increase in content of tack-imparting agent. This feature of emulsion adhesives contrasts with solution adhesives of polyvinyl acetate where it is generally true that for a given degree of tack in the film produced, the higher the molecular weight of the polymer, the more tack-imparting agent required. Thus, in our compositions, the additional strength gained by using a higher polymer is not lost by the necessity of using more tack-imparting agent.

The term "viscosity" of polyvinyl acetate as used in the preceding paragraph and elsewhere in this disclosure is the viscosity in centipoises at 20° C. of a solution in benzene containing 86 grams of the dry resin per litre of solution.

TACK-IMPARTING AGENTS

Quite unexpectedly, it has been discovered that the usual resinous tackifiers added to these emulsions do not assist in the production of a tacky film. However, the addition to these emulsions of certain selected materials of the class generally considered as plasticizers for polyvinyl acetate gives adhesive compositions having the very specific desirable properties described herein. Moreover, we have found that the action, as far as imparting adhesive qualities is concerned, of a tack-imparting agent or tackifier in an emulsion differs markedly from a similar addition to a solution. For example, the addition to an emulsion as in Example 2 of 50 parts of dibutyl phthalate per 100 parts of polyvinyl acetate produces a tacky film with good strength, whereas the same amount in a solution of polyvinyl acetate of the same viscosity grade would provide a wholly useless film, sticky but weak. That is, the amounts of plasticizer, used according to the present invention, are, in general, in excess of plasticizing concentrations effectively employed in solutions of polyvinyl acetate.

Tack-imparting agents are selected from the materials classed as plasticizers for polyvinyl acetate, and we have discovered that certain polyvinyl acetate plasticizers are exceptionally effective to impart the desirable properties of tack and slip-resistance, as elaborated more fully herein. Even these are not all equivalent in their effect on the tack or other properties of the adhesive films. The figure in brackets after the name of the plasticizer indicates that it may without significant change in film properties replace dibutyl phthalate, taken as an arbitrary standard, when used at about this percentage of the weight of dibutyl phthalate. The absence of a bracketed figure indicates that the tack-imparting agent is the substantial equivalent of dibutyl phthalate for the purposes set out in this application.

Plasticizers which we have found effective for the purposes defined herein are:

Acetyl triethyl citrate
O-Nitrodiphenyl
Dimethyl sebacate (55%)
Monobutyl benzene sulphonamide (75%)
Butyl phthalyl butyl glycollate
Ethyl phthalyl ethyl glycollate (110%)
Methyl phthalyl ethyl glycollate and phthalic esters selected by the criterion that when mixed with polyvinyl acetate they exert a softening or plasticizing action on the resin and are compatible to an extent sufficient to allow 200% elongation at 25° C. of a 20 mil test strip ¼" wide in a tensile test machine, in which the moving jaw travels 1.1 feet per minute, for example a Scott machine Model D. H. Examples of phthalates which meet this criterion are:

Dimethyl phthalate (80%)
Diethyl phthalate (90%)
Diamyl phthalate
Diisoamyl phthalate
Dibutyl phthalate
Dimethoxy ethyl phthalate
Dibutoxy ethyl phthalate

REINFORCING ADDITIONS

Bonds made with the adhesives of this invention show some tendency to be weakened by temperatures above 75° F., and the making of bonds under conditions of high humidity is difficult due to slow drying. The sensitivity of the bonds in these respects is greatly lessened by the addition of nitrocellulose containing not over about 12% nitrogen, for example a lacquer grade. Nitrocellulose is uniquely effective for this purpose, and its effect is entirely unexpected in view of the limited amounts employed. The operative range is up to about 20% nitrocellulose by weight on the polyvinyl acetate, with about 5% to 10% preferred. The viscosity grade of the nitrocellulose should be 100 seconds or less with ½ second or less preferred, as the lower viscosity grades do not stiffen the film formed from the compositions.

SOLVENTS

The compositions of the invention may also include solvents. These solvents must be immiscible with water, but otherwise may be selected according to their particular utility for the present invention. For use on leather, butyl acetate, xylene, or ligroin are of assistance in cutting the film of grease on the skin. The amounts are not critical, but about 10% on the parent emulsion is usually sufficient. Low boilers such as ethyl acetate allow the full bond strength to be developed more rapidly than do high boilers.

PREPARATION OF THE ADHESIVE COMPOSITION

A preferred method of preparation is as follows. The parent emulsion is charged into a tank and the solvent containing the plasticizer (and nitrocellulose, if any,) is added at a rate so adjusted that the necessary additions of diluting water and solvent, preferably made from separate inlets, are completed at about the same time. Solvents in which water is appreciably soluble should be saturated with water before use. Vigorous stirring is provided during the addition. The charge is thoroughly mixed for a few minutes longer and then filtered, preferably through open-mesh cloth. The nitrocellulose, if used, is added in solution in a solvent. The nitrocellulose solution should contain as much of the tack-imparting agent as it will tolerate without precipitation of the nitrocelluluose. The balance of the tack-imparting agent, if any, must be added to the emulsion separately. The rate of stirring should be fast enough to prevent segregation of the solvent and plasticizer on the surface during the addition. The stirrer should be immersed sufficiently to prevent undue beating in of air, which would cause foam.

The resulting compositions are unchanged in their adhesive properties on storage for more then six months at room temperature.

METHODS OF APPLYING THE ADHESIVE COMPOSITION

By suitably adjusting the solid content of the adhesive it may be applied by various methods, as for example by spraying, brushing, or roll-coating. The adjustment is readily made by small additions of water while stirring. Suitable approximate ranges are:

| | Percent solids |
|---|---|
| Spraying | up to 48 |
| Brushing | 48–55 |
| Roll-coating | 30–60 |

For the present purpose, solids are defined as the sum of the resin, the emulsifier, and the tack-imparting agent.

ADHESIVE COMPOSITIONS

Various types of adhesive compositions can be made according to this invention by varying the concentration of the essential constituents. The approximate normal limits of concentration of polyvinyl acetate and of dibutyl phthalate or other tack-imparting agent of equivalent effectiveness, are shown in the following Table I. The concentration of polyvinyl acetate is based on the final adhesive composition and that of the tack-imparting agent on the polyvinyl acetate. Other tack-imparting agents of greater or lesser effectiveness are used in proportion to their equivalent concentrations as above. The concentration of the polyvinyl acetate is within a range effective to render the finished composition suitable for application by the methods defined and to permit the emulsion to remain stable.

TABLE I

|  | Polyvinyl Acetate (per cent by weight of the composition) | Dibutyl Phthalate (per cent by weight of polyvinyl acetate) |
| --- | --- | --- |
| A. Adhesive bonded wet, high tack not required | 22-50 | 20-40 |
| B. Adhesive bonded dry, strong bond and long duration of tack required | 19-45 | 35-60 |
| C. Adhesive bonded wet, high tack required, bond may be weak | 11-40 | 60-180 |
| D. Adhesive bonded dry by heat sealing | 22-50 | 20-40 |

USES

The fields of use of these adhesives are wide. For instance, those of the classes referred to above may be used in the following applications. Certain compositions of class A containing about 42% to about 50% polyvinyl acetate are effective for padding paper and for bonding cloth. Certain compositions of class B, containing about 33% to about 45% polyvinyl acetate, are effective as sole laying and combining cements, folding cements, breasting cements, "Goodyear" and "McKay" channel cements, and heel building cements, as used in shoe manufacturing. Certain compositions of class C, containing about 25% to about 40% polyvinyl acetate, are useful as counter dipping cements, as sock and tongue lining cements, and grid machine cements, as used in shoe manufacturing, and as adhesives for labelling bottles and cans. Certain compositions of class D, containing about 42% to about 50% polyvinyl acetate, are effective for applying labels or decorative cut-outs, particularly in automatic machinery. Other uses will be apparent to those skilled in the art.

ADVANTAGES

Equipment used in miixng or applying the compositions of this invention is readily cleaned by rinsing with water in contrast to solution type adhesives which require the use of cleaning solvents which are costly and often are toxic and/or inflammable. When first applied the adhesive is milky, but on evaporation of the water this milkiness disappears providing a reliable indicator of the readiness of the surfaces to be bonded. Those adhesive containing the higher amounts of tack-imparting agent remain tacky for periods as long as 14 days or more, provided that the surfaces are protected from dust.

These adhesive compositions are readily diluted with water to reduce the solids content to make them suitable for various methods of application. Likewise they can be readily mixed with parent emulsions containing no tackifier, to reduce the concentration of that agent. Thus it is unnecessary to maintain stocks of many different compositions.

The strength of the bond made with these adhesive compositions increases with the age of the bond and is unaffected by water except on prolonged immersion.

METHODS OF TESTING

BOND STRENGTH

A long strip of coarse unfilled cotton sheeting, 2" wide, is given a coating of the adhesive under test about 2 mils thick in the wet state; after air drying for about ½ hour a second similar coat is applied. This is allowed to dry until it develops a definite tack as tested by touch, usually 10-15 minutes. The strip is then folded lengthwise, adhesive to adhesive and passed through rubber wringer rolls exerting a pressure of about 145 lbs. It is then cut into 3" lengths.

At 15 minutes from the time of application of the second coat and at 5 minute intervals thereafter, one three inch portion is tested in a Scott tensile strength machine. The ends are peeled back about 1" and clamped in the machine so as to exert a peeling pull.

The "bond strength" is the pull required to separate the sheets, expressed as pounds per inch width of strip. Its value at 30 minutes and its maximum are recorded.

INITIAL, MAXIMUM, AND OVERNIGHT TACK; DURATION OF TACK

A similar strip of sheeting is given two coats following the same procedure as in the above test, but after the second coat it is cut at once into 6" lengths and at successive 5 minute intervals from the application of the second coat it is bonded adhesive to adhesive in the rolls and tested at once by the same procedure as above. Usually ten tests are made, followed by one the next morning.

The pull per inch of bond required to separate the sheets in successive tests rises to the "maximum tack" and then usually decreases. The time at which 50% of this maximum occurs is designated as the "initial tack." The pull per inch of bond required by the sample tested next morning is called "overnight tack."

The "duration of tack" is the elapsed time during which the separating pull remains above 50% of its maximum value. If the value next morning is still above 50% of the maximum, the duration of tack is called infinite.

SLIP TEST

A number of strips of sanded calf leather (6 inches by 1 inch) are coated with the adhesive under test by any suitable means, for instance by brushing. After drying for two hours, or overnight, the sample is folded adhesive to adhesive and rolled as for the above tests. For the purposes of this test, there is employed an apparatus similar to that illustrated in the single figure of the drawing. The bond is then opened, that is the strips pulled apart, for about one half inch and (referring to the drawing) the ends of the respective strips A and B are secured by the spring clamps 11 and 12, the upper one 11 of which is fixed to a support 20 while the lower one 12 carries a weight 22 of 500, 1000, or 1500 grams including the clamp and pulls on the adhesive bonds as shown. At fifteen minute intervals the position of a reference line on the lower clamp 12 is noted by a cathetometer 25, or any equivalent method, estimating to one-eightieth of an inch. The position at fifteen minutes is taken as the datum. Samples where the weight does not fall more than one-eighth of an inch in one hour (corresponding to the bond opening 1/16 inch) are considered "O. K." For others, the time to slip one-eighth of an inch is obtained by interpolation, this is known as the "slip time."

The time of drying and the weight used must, of course, also be specified.

All the above tests are done at temperatures between 70° and 74° F.

EXAMPLES

The preparation of coating compositions from typical parent emulsions is illustrated by the following examples which are, of course, furnished merely by way of illustration and not necessarily as indicating the limits of the invention.

Example 1

The parent emulsion of polyvinyl acetate contained about 55% solids, of which about 0.6% was gum tragacanth, about 0.5% was partially hydrolyzed polyvinyl acetate (original viscosity 7 C. P. S.) containing about 34% polyvinyl acetate by weight, and about 0.1% was the sodium salt of the sulphonic acid of dioctyl succinate (Aerosol O. T.). The viscosity of the polyvinyl acetate was 145. The viscosity of the emulsion was about 2800 centipoises at 20° C.

100 pounds of this parent emulsion was charged into a tank. To this emulsion was added 20 pounds of dibutyl phthalate dissolved in 8.8 pounds of butyl acetate, and 10 pounds of water, the addition of the water and the solution being made from separate inlets and adjusted so as to be completed at about the same time. Vigorous stirring was provided during the addition, the rate of stirring being sufficiently fast to prevent any segregation of the solvent and plasticizer on the surface during the addition. The stirrer was immersed sufficiently to prevent any undue beating in of air which would cause foam. The charge was thoroughly mixed for a few minutes longer, then filtered through cheese cloth.

Examples 2 and 3

Two adhesive compositions were made by the same procedure and from the same parent emulsion as Example 1, but using respectively 27½ pounds and 35 pounds of dibutyl phthalate.

The properties of the three adhesives, which are examples respectively of the groups A, B, and C referred to above, were determined by the methods described below and were as shown in Table II.

TABLE II

| Ex. | BSH, lbs./in. | BSM, lbs./in. | IT, mins. | DT, mins. | MT, lbs./in. | OT, lbs./in. | S2D, min.-gm. | SND, min.-gm. |
|---|---|---|---|---|---|---|---|---|
| 1 | 9.9 | 13 | 4 | 12 | 5.1 | 0.5 | OK-1000 | |
| 2 | 9.3 | 10.3 | 5 | 45 | 5.1 | 2.1 | OK-1000 30-1500 25-500 7-1000 | OK-500 30-1000 10-500 3-1000 |
| 3 | 6.8 | 9.3 | 8 | 45 | 8 | 2.6 | | | where

BSH is the bond strength at half an hour,
BSM is the maximum bond strength,
IT is the initial tack,
DT is the duration of tack,
MT is the maximum tack,
OT is the overnight tack,
S2D is the slip time for two hours drying at the specified load,
SND is the slip time for overnight drying at the specified load.

The results of Examples 1 to 3 show that the slip test decreases rapidly above a certain amount of plasticizer. This change is accompanied by a significant increase in the initial tack which is, for certain uses, the property of paramount importance.

Example 4

The parent emulsion of polyvinyl acetate contained 54% solids of which about 0.5% was gum tragacanth, about 0.4% was partially hydrolyzed polyvinyl acetate (original viscosity 7 C. P. S.) containing about 30% polyvinyl acetate by weight, and about 0.1% was the sodium salt of the sulphonic acid of dioctyl succinate (Aerosol O. T.). The viscosity of the polyvinyl acetate was 145 and the viscosity of the emulsion was about 2000 centipoises at 20° C.

An adhesive composition was prepared from this emulsion as in Example 1 except that the additions consisted of 5 pounds of 17 second RS grade nitrocellulose dissolved in 25 pounds of butyl acetate and 27½ pounds dibutyl phthalate, and, separately, 5 pounds water. The S2D test at 1000 grams was O. K.

Discussion of Example 4

The slip strength of compositions including nitrocellulose is maintained under conditions of high temperatures encountered during normal summer weather, and bonds can be made under conditions of high humidity without difficulty.

Examples 5 to 9

Five adhesive compositions were made by the same procedure and from the same parent emulsion as Example 1, but using the plasticizers and amounts thereof noted in Table III, per 100 lbs. of parent emulsion. The adhesives were tested with the results noted, also in Table III.

TABLE III

| Ex. | Plasticizer | Amount | S2D | SND |
|---|---|---|---|---|
| | | Pounds | | |
| 5 | Methyl phthalate ethyl glycollate | 27½ | OK-1000 10-1500 | OK-500 1-1000 |
| 6 | Diamyl phthalate | 27½ | 60-1000 17-1500 | OK-1000 30-1500 |
| 7 | Dibutoxy ethyl phthalate | 27½ | OK-500 30-1000 26-1500 | OK-1000 13-1500 |
| 8 | Dimethyl sebacate | 15 | OK-500 25-1000 | OK-500 54-1000 |
| 9 | Monobutyl benzene sulphonamide | 20 | OK-500 17-1000 | OK-1000 15-1500 |

Examples 5 through 9 illustrate the replacement of dibutyl phthalate by an effectively equivalent amount of other plasticizers.

Example 10

An adhesive composition was prepared equivalent to that in Example 2 except that the viscosity of the polyvinyl acetate was 500. The tests showed S2D: O.K.—1000 g.; SND: O.K.—500 g., 35 mins.—1000 g.

Example 11

An adhesive composition was prepared from the same parent emulsion as was used for Example 1. The preparation was carried out as in Example 1 except that the additions consisted of 2.5 lbs. of ¼ second SS grade nitrocellulose dissolved in 10 lbs. butyl acetate and 27½ lbs. dibutyl phthalate, and, separately, 5 lbs. water. The tests showed S2D: O.K.—1000 g., 35 mins.—1500 g.; SND: O.K—1000 g., 36 mins.—1500 g.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. An adhesive composition comprising (A) a stable aqueous emulsion of polyvinyl acetate formed by emulsion polymerization, said emulsion having a viscosity within the range from 100 to 5000 centipoises at 20° C. and containing as emulsifiers (a) gum tragacanth within the range from 0.25% to 1.0% by weight of the emulsion, (b) partially hydrolyzed polyvinyl acetate, which contains from 16% to 35% by weight of polyvinyl acetate, within the range from 0.25% to 0.75% by weight of the emulsion, and (c) an anionic surface-active agent, said polyvinyl acetate having a viscosity (measured at 86 grams per litre in benzene at 20° C.) greater than 20 centipoises and being present in an amount ranging from 40% to 60% by weight of the emulsion: (B) a plasticizer for polyvinyl acetate selected from the group consisting of dimethyl phthalate, diethyl phthalate, diamyl phthalate, diisoamyl phthalate, dibutyl phthalate, dimethoxy ethyl phthalate, dibutoxy ethyl phthalate, butyl-carboxy-methyl butyl phthalate, ethyl-carboxy-methyl ethyl phthalate, ethyl-carboxy-methyl methyl phthalate, acetyl triethyl citrate, O-nitrodiphenyl, dimethyl sebacate and monobutyl benzene sulphonamide, in an amount ranging from 20% to 180% by weight of the polyvinyl acetate; and (C) nitrocellulose, of less than 100 seconds viscosity, present in an effective amount of up to 20% by weight of the polyvinyl acetate.

2. A composition according to claim 1, wherein the plasticizer is dibutyl phthalate.

GEORGE OSMAN MORRISON.
THOMAS PATTON GLADSTONE SHAW.
JOSEPH DONAT PAUL-EMILE MERCIER.
HENRY MICHAEL COLLINS.

REFERENCES CITED

The following references are of record in the file of this patent:

UNITED STATES PATENTS

| Number | Name | Date |
| --- | --- | --- |
| 2,137,377 | Bauer | Nov. 22, 1938 |
| 2,343,089 | Smith | Feb. 29, 1944 |
| 2,343,093 | Smith | Feb. 29, 1944 |
| 2,346,755 | Hemming | Apr. 18, 1944 |
| 2,388,600 | Collins | Nov. 6, 1945 |
| 2,388,602 | Kiar | Nov. 6, 1945 |
| 2,371,001 | Stone | Mar. 6, 1945 |